US009023954B1

(12) United States Patent
Wright

(10) Patent No.: US 9,023,954 B1
(45) Date of Patent: May 5, 2015

(54) SIDE-CHAIN AND END-GROUP MODIFIED POLY-P-PHENYLENE OLIGOMERS

(71) Applicant: The United States of America, as represented by the Secretary of the Navy, Washington, DC (US)

(72) Inventor: Michael E. Wright, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/133,723

(22) Filed: Dec. 19, 2013

Related U.S. Application Data

(60) Provisional application No. 61/745,859, filed on Dec. 26, 2012.

(51) Int. Cl.
 *C08L 65/02* (2006.01)
 *C09J 161/02* (2006.01)

(52) U.S. Cl.
 CPC ............... *C09J 161/02* (2013.01); *C08L 65/02* (2013.01)

(58) Field of Classification Search
 CPC ...................................................... C08L 65/02
 See application file for complete search history.

(56) References Cited

U.S. PATENT DOCUMENTS

| | | | | |
|---|---|---|---|---|
| 4,339,595 | A * | 7/1982 | Udovich et al. | 560/76 |
| 4,767,797 | A * | 8/1988 | Ai et al. | 522/8 |
| 5,496,893 | A * | 3/1996 | Gagne et al. | 525/50 |
| 5,741,936 | A * | 4/1998 | Paetz et al. | 568/306 |
| 5,827,927 | A   | 10/1998 | Gagne et al. | |
| 6,512,122 | B2 * | 1/2003 | Lin et al. | 548/440 |
| 6,800,381 | B2 * | 10/2004 | Cho et al. | 428/690 |
| 7,635,741 | B2 * | 12/2009 | Niu et al. | 526/281 |
| 2009/0030084 | A1 * | 1/2009 | Kurosu et al. | 514/651 |

OTHER PUBLICATIONS

Roberts et al. "Curing Chemistry of Phenylethynyl-Terminated Imide Oligomers: Synthesis of 13C-Labeled Oligomers and Solid-Stated NMR Studies" Journal of Polymer Science: Part A: Polymer Chemistry, vol. 38, 3486-3497, 2000.*
Fang et al. "A Solid-State 13C NMR Study of the Cure of 13C-Labeled Phenylethynyl End-Capped Polyimides" Macromolecules, 2000, 33, 1671-1681.*
Watson et al. "Big Is Beautiful—"Aromaticity" Revisited from the Viewpoint of Macromolecular and Supramolecular Benzene Chemistry" Chem. Rev. 2001, 101, 1267-1300.*
"Thermal Hemnal Degradation Study of IM7/DMBZ-15 High Temperature Composite by TGA/FTIR" F McDonald/ M Nadler, NAWCWD-TP-8568, 2003, 50 pp. Loc#: 134455; unclassified, CL., CA.
Guenthner et al, New cyanate ester and poly(p-phenylene) resins with low moisture absoprtion and improved thermal stability, ch 17, 2009 pp. 198-208, 2009 ACS.

* cited by examiner

*Primary Examiner* — Robert S Loewe
(74) *Attorney, Agent, or Firm* — Charlene A. Haley

(57) ABSTRACT

An efficient synthesis of polymer end-caps and poly-p-phenylene oligomers that absorb little water and provide new processing and curing strategies, and more specifically, high-performance resins and adhesives with low moisture uptake can have a two stage cure path with an unprecedented range of curing temperatures.

4 Claims, 1 Drawing Sheet

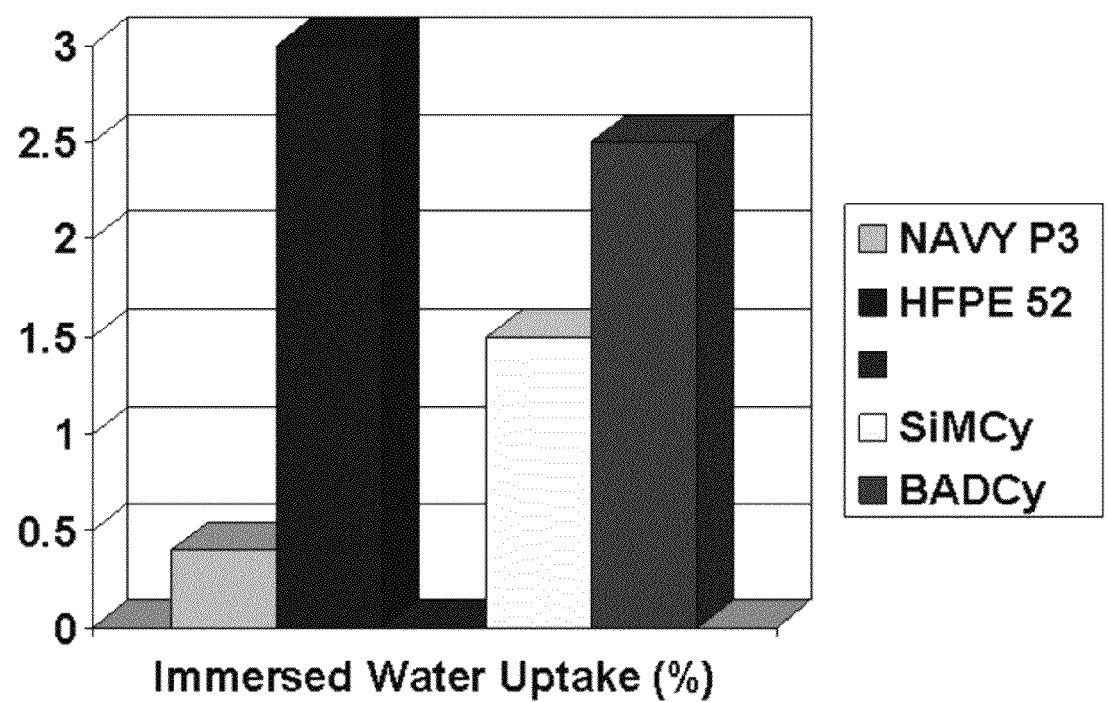

SIDE-CHAIN AND END-GROUP MODIFIED POLY-P-PHENYLENE OLIGOMERS

CROSS-REFERENCE TO RELATED APPLICATIONS

This is a non-provisional patent application, claiming the benefit of parent application Ser. No. 61/745,859 filed on Dec. 26, 2012, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to efficient synthesis of polymer end-caps and poly-p-phenylene oligomers that absorb little water and provide new processing and curing strategies, and more specifically, high-performance resins and adhesives with low moisture uptake can have a two stage cure path with an unprecedented range of curing temperatures.

BRIEF DESCRIPTION OF THE DRAWING

FIG. 1 is a graph showing in that phenyl-ethynyl (PE)-end capped thermally curing resins based on poly-p-phenylenes show exceptionally low water uptake compared to polyimides, cyanate esters, and epoxies, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

Embodiments of the invention generally relate to efficient synthesis of polymer end-caps and poly-p-phenylene oligomers that absorb little water and provide new processing and curing strategies, and more specifically, high-performance resins and adhesives with low moisture uptake can have a two stage cure path with an unprecedented range of curing temperatures.

There is a need to develop composite resins and adhesives that have minimal water absorption. Water contained within a resin will upon rapid healing lead to catastrophic damage and then failure of the part/joint. Typical polyimides and epoxies absorb nearly 3 wt-% water and in fact do fail upon rapid heating. Thus, polymer backbones are needed that do not retain/absorb water; hence, minimizing failures due to rapid heating and off-gassing by steam generation internal to the material.

Typical phenylethynyl terminated polyimide (PETI) resins is described. There is no lack of information or patents on PETI resin systems. Several are now commercially available from a limited number of companies worldwide. The chemical structure of the PETI end group that affords a thermally stable crosslinking of the resin is shown in

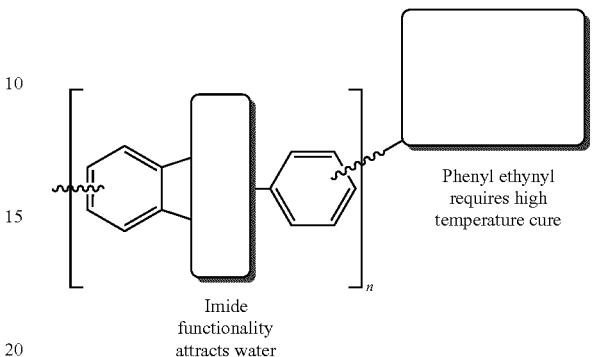

Chemical Schematic 1. Typical chemical structure of a phenyl ethynyl terminated polyimide (PETI).

The PETI materials have many common attributes; most notable, is a requisite curing temperature of over 650° F. (Storage et al, High Temple Meeting presentation, 2006). For most PETI's, micro-cracking is problematic. The cracking is due in part to a very high cross-link density, which may trap localize regions of high stress in the cured matrix. One other area of concern for the current PETI polyimides is their ability to absorb significant amounts of water (~2-3 wt-%). This produces a wet-Tg knock down of ~40° C. or more. In the case of rapid heating, the trapped water can be convened to steam resulting in catastrophic delamination [see: "Thermal Hermal Degradation Study of IM7/DMBZ-15High Temperature Composite by TGA/FTIR" Frank McDonald and Melvin Nadler, NAWCWD-TP-8568, 2003, 50 pp, Local number: 134455; unclassified, China Lake, Calif. 93555].

Research and development from the Naval Air Warfare Center in China Lake has demonstrated that phenyl-ethynyl (PE)-end capped thermally curing resins based on poly-p-phenylenes show exceptionally low water uptake compared to polyimides, cyanate esters, and epoxies (see FIG. 1). FIG. 1. HFPE-52 is a NASA developed polyimide. The SiMCy and BADCy are cyanate ester resins. The NAVY P3 is a PE end-capped poly-p-phenylene has been previously published.

Work has been patented based on end-capping strategies for poly-p-phenylenes (U.S. Pat. No. 5,827,927, 1998); however, further research and experimentation was needed to understand several notable improved features which are absent and key data is lacking. First and foremost is the ability to modify and successfully generate a thermally reactive (i.e. cross-linking) high performance resin and tailor the resulting glass transition (Tg) for the material. Secondly, there is no evidence presented that in fact the end-group functionality is as described (either analytical data or by inference to reactivity). End-group functionality is one of the most critical factors in determining when poly-p-phenylenes can be successfully used in high-performance resins.

Research and development carried out at "China Lake" (as noted above) on poly-p-phenylenes demonstrated good thermal stability and also the need for using small oligomers in order to achieve a targeted high Tg for the cured resin. This research and development continues to demonstrate and document the ability to further control end-capping chemistries and introduce novel end-caps capable of curing at low temperatures yet retain excellent high temperature stability. Furthermore, this research clearly shows the unexpected benefit to having more than one chain-extension chemistries in combination with cross-linking chemistry that ultimately generates a superior high-performance resin with super low moisture uptake. Hence, the materials prepared by this research represent a high performance composite resin system with exceptional versatility and control over processing parameters, mechanical strength/toughness, and glass transition.

Experimental Data

End-caps are typically prepared by acylation chemistry using 2- or 3-chlorobenzoyl chloride, although other acyl-equivalents can be used as described in the literature. Several protecting groups (P) can be used including, but not limited to, methyl, 2-tetrahydropyranyl, trimethylsilyl, and benzyl. An embodiments includes the benzyl as the protecting group. Catalysts can be typical Lewis acids including, but not limited to, aluminum trichloride, boron trifluoride, protons from a strong acid, or other reagents capable of performing the function of a Lewis Acid. In embodiments, 3-chlorobenzoyl chloride is the reagent for acylation.

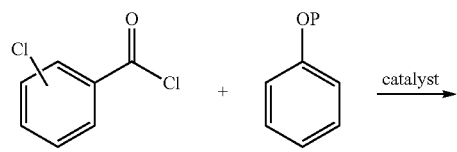

Monomers can be prepared in a similar manner using acylation chemistry starting from 2,5-dichlorobenzoyl chloride or an equivalent dihalo acyl-aromatic component.

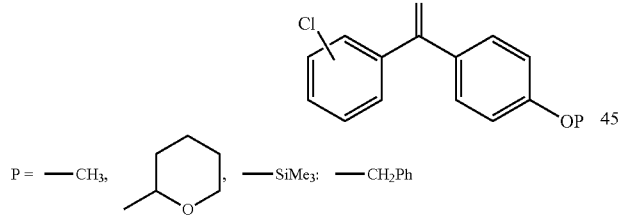

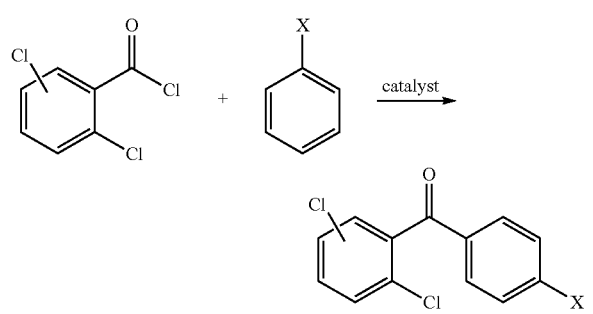

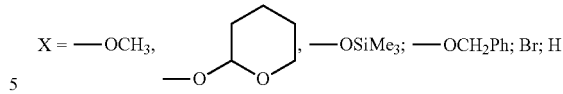

Of particular importance to this embodiment is the synthesis of aryl-ethynyl monomers as these represent a novel class of monomers for the end-capped poly-p-phenylenes. The monomers are prepared via a palladium catalyzed reaction as shown below and prepared in better than 80% chemical yield and isolated as "substantially" pure crystalline compound. As used herein, the term "substantially pure" refers to a substance that has 95% or better chemical purity.

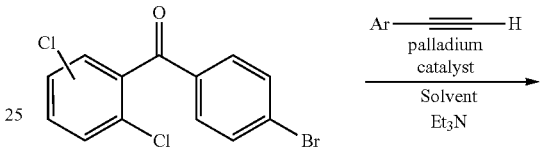

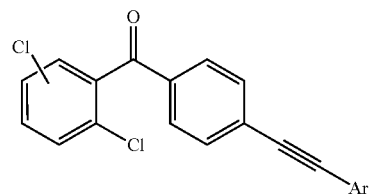

Typical Ar=phenyl, 2-naphthyl, 9-anthracenyl

Preparation of the hydroxyl end-capped poly-p-phenylene oligomers is described below using typical nickel catalyzed polymerization chemistry. When using the aryl-ethynyl monomers, X=Ar-ethynyl, as drawn above, concentrations can range from 0-50 mol-% with values of less than 20 mol-% being preferred in this invention. Other group X monomers and end-caps can be used in concentrations ranging from 0 to 100 mol-% and be systematically tuned/tailored to achieve a targeted: 1) cure temperature profile, 2) end use glass-transition for the cured resin, 3) and toughness and compatibility with tougheners and fibers. See Chemical Schematic 2.

Chemical Schematic 2.

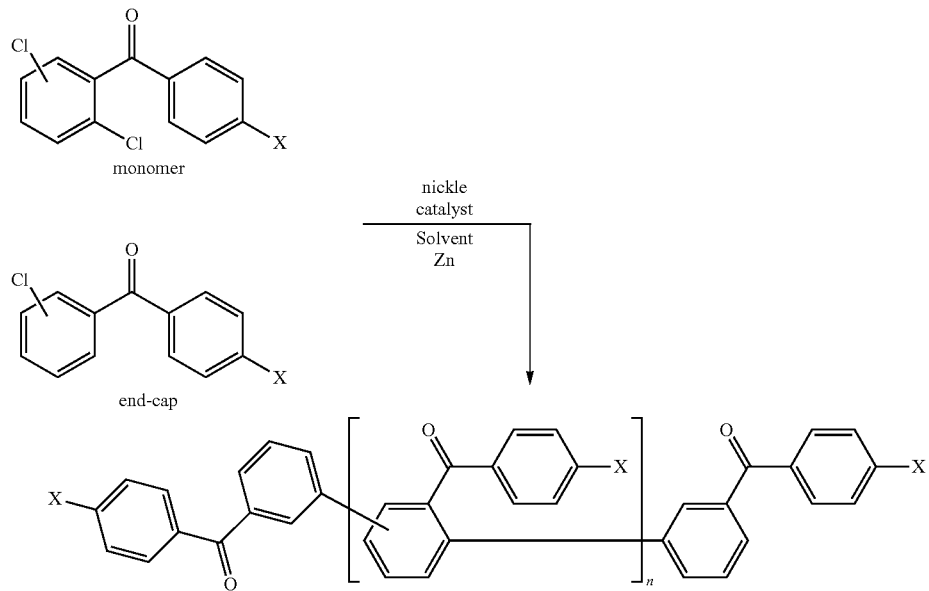

In this embodiment, deprotection affords hydroxyl-terminated poly-p-phenylenes and also combinations thereof where hydroxyl groups are selectively formed on the oligomer backbone. Examples can be used where the hydroxyl groups are used exclusively on the backbone and/or the end-group of the oligomer (as shown in Chemical Schematic 3).

Chemical Schematic 3.

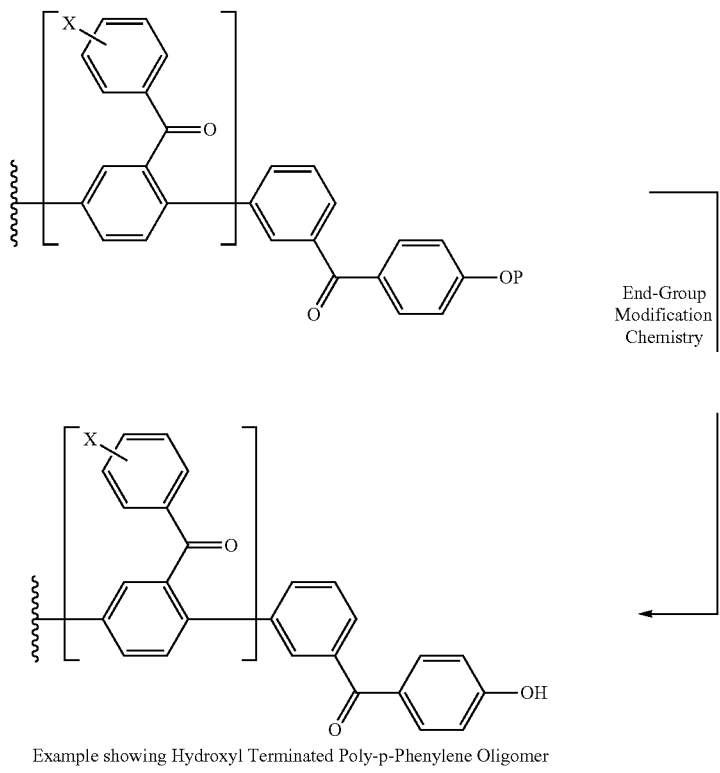

Example showing Hydroxyl Terminated Poly-p-Phenylene Oligomer

Modification of the hydroxyl groups in the poly-p-phenylene oligomers is accomplished using new chemistries based on substitution with various heterocycles (e.g. tetrazine) and aryl ethynyl carboxylate derivatives. The net result is several novel classes of both end-capped and side-group modified poly-p-phenylene oligomers capable of forming new high performance composite resins and adhesives. Chemical Schematic 4 shows modification of just the end-capped poly-p-phenylene oligomer resulting in a tetrazine terminated oligomer. Several other nitrogen heterocylces can be used to end-cap the oligomer. For example, 3-chloropyridazine and 3-chlorophthalizine can be utilized to make end-caps that only will produce Stage A cure chemistry.

Chemical Schematic 4.

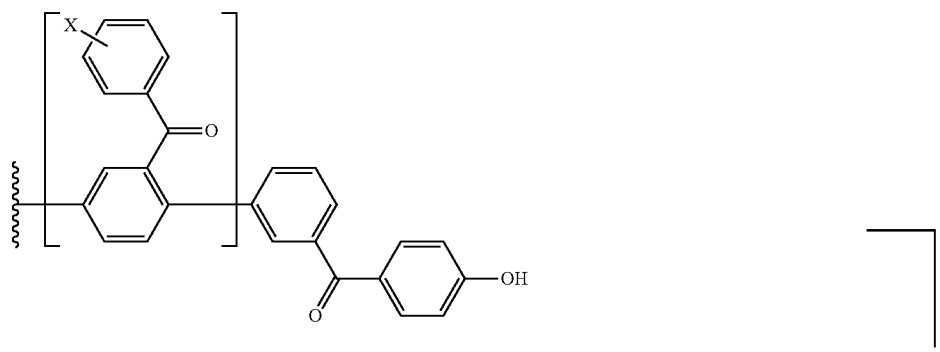

Tetrazine Terminated Poly-p-Phenylene Oligomer

In Chemical Schematic 5 shown below, reaction of the tetrazine end-capped oligomer (resin) is mixed with an aryl-ethynyl end-capped oligomer (resin) and then concurrent with or after processing, reaction of the end-groups leads to a cured composite resin and/or adhesive. Nitrogen is released during the cure reaction and by applying modest vacuum or pressure (5-150 psig) voids in the finished product can be eliminated. This cure cycle can be the final or initial stage of curing. In embodiments, this is a use if this reaction is in the initial stage (i.e. Stage A) thus allowing for more facile release of the nitrogen gas.

Chemical Schematic 5.

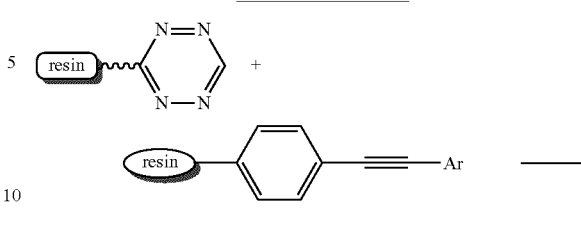

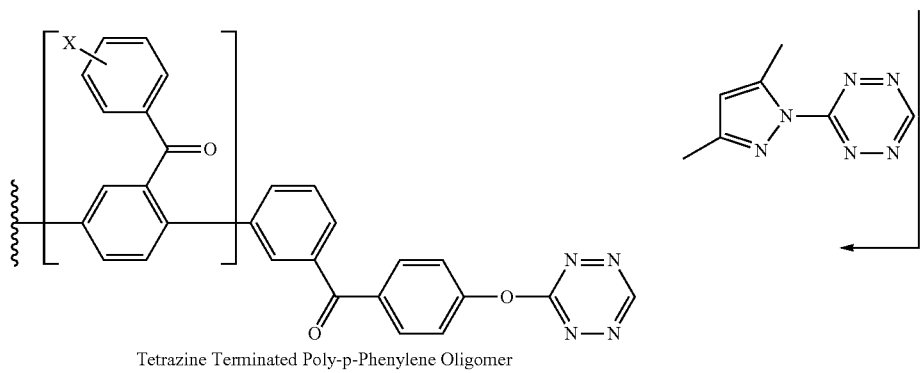

-continued

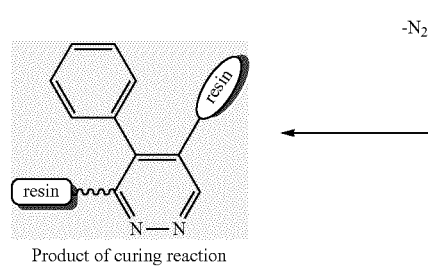

Product of curing reaction

Final curing of the resin system (Stage B) occurs through a single and/or combination of curing steps. The process is controlled by varying the concentration of aryl-ethynyl groups and type of nitrogen end-cap utilized in the invention. The final curing reaction(s) should be in the range of 1-50 mol-% of the Stage A cure chemistry, with 5-20 mol-% as an embodiment of molar ratio shown in Chemical Schematic 6 below.

In embodiments, the reducing metal reagent(s) is selected from the group consisting of metallic zinc, magnesium, lithium, and sodium. In embodiments, the dipolar solvent(s) is selected from the group consisting of at least one of dimethyl formamide, N-methylpyrrolidine, dimethyl acetaamide, and other nitrogen including aromatic solvents. In embodiments, the non-solvent(s) is prepared using at least Chemical Structure 6.

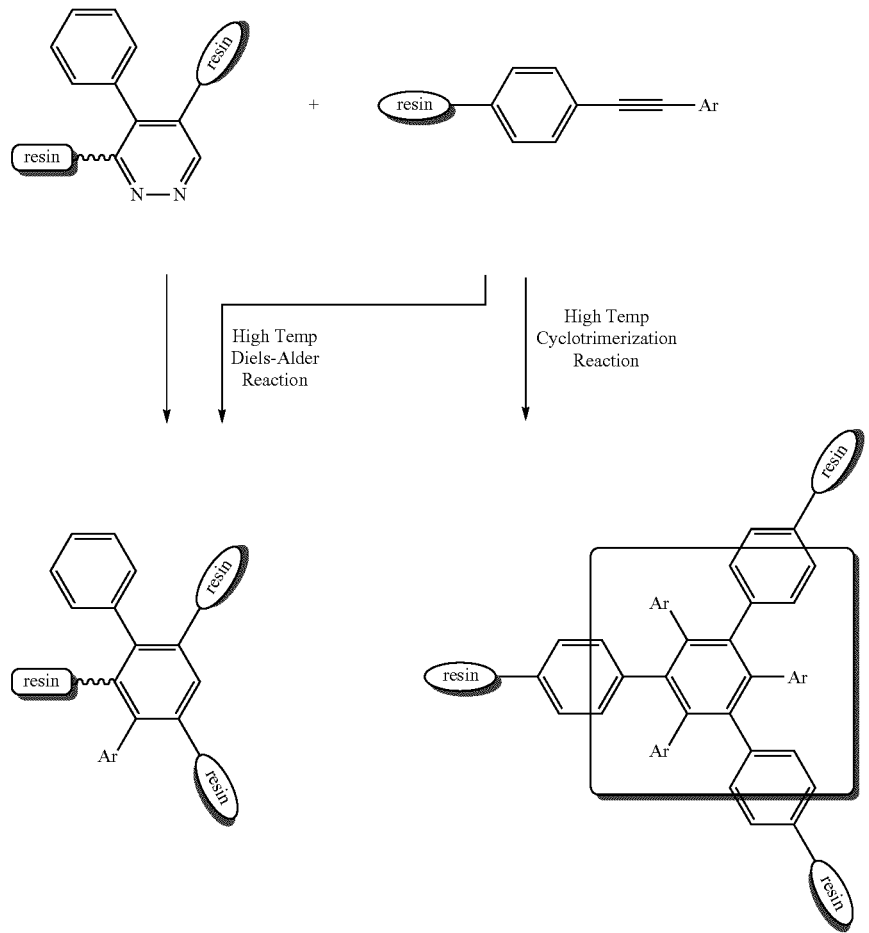

Embodiments of the invention generally relate to methods for manufacturing reactive end capped resins and/or adhesives including, dissolving at least one dichloroaromatic monomer and at least one monochloroaromatic protected end cap in a dipolar aprotic solvent, adding at least one reducing metal reagent and one transition metal catalyst to create reaction first mixture, heating the first mixture for 1-12 h at a temperature between about 25 to about 100° C. to create a second mixture, filtering the second mixture to produce a third mixture, adding the third mixture to a non-solvent forming a protected resin/adhesive, and collecting the protected resin/adhesive by filtration, drying the protected resin/adhesive at 25 to 100° C. for 24-48 h to produce a dried protected end capped resins/adhesives, deprotecting the dried protected end capped resins/adhesives, and reacting the deprotected end capped resins/adhesives a nitrogen including aromatic electrophile to produce reactive end capped resins and/or adhesives.

one solvent selected from the group consisting of methanol, water, acetone, hexane, ethanol, iso-propanol, and methyl ethyl ketone.

Another embodiment of the invention generally relates to methods for manufacturing a monochloroaromatic protected end cap including, providing at least one 3- or 4-haloaromatic acid chloride to mixture of at least one oxygen-protected phenol in the presence of at least one catalyst to create first mixture, and stirring the first mixture for about 2 to about 24 hours to produce monochloroaromatic protected end cap. In embodiments, at least one catalyst(s) is selected from the group consisting of at least one aluminum trichloride, boron trifluoride, protons from a strong acid, and other reagents capable of performing the function of a Lewis Acid. In other embodiments, the resin(s) and/or adhesive(s), includes the formulation:

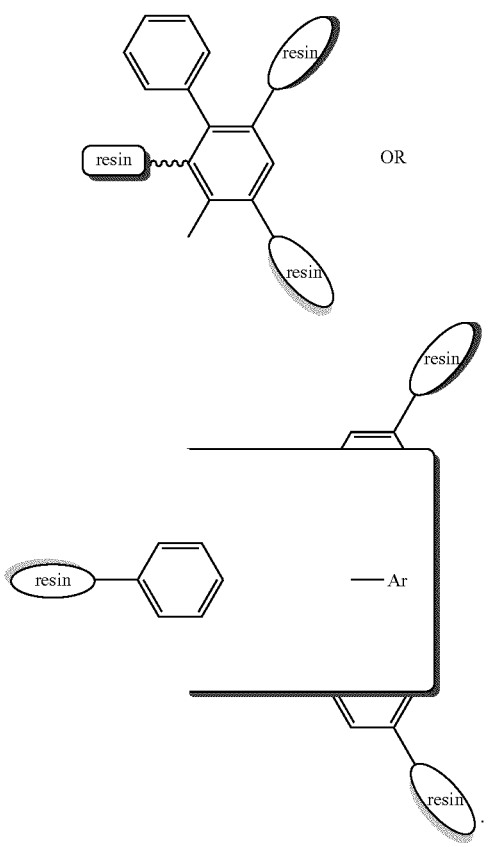

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other state or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for manufacturing reactive end capped resins or adhesives, comprising:
    dissolving at least one dichloroaromatic monomer and at least one monochloroaromatic protected end cap in a dipolar aprotic solvent;
    adding at least one reducing metal reagent and one transition metal catalyst to create a first mixture;
    heating said first mixture for 1-12 h at a temperature between about 25 to about 100° C. to create a second mixture;
    filtering said second mixture to produce a third mixture;
    adding said third mixture to a non-solvent forming a protected resin, and collecting said protected resin by filtration;
    drying said protected resin at 25 to 100° C. for 24-48 h to produce a dried protected end capped resins or adhesives;
    deprotecting said dried protected end capped resins or adhesives; and
    reacting said deprotected end capped resins with a nitrogen including aromatic electrophile to produce reactive end capped resins or adhesives.

2. The method according to claim 1, wherein said reducing metal reagent is selected from the group consisting of metallic zinc, magnesium, lithium, and sodium.

3. The method according to claim 1, wherein said dipolar solvent is selected from the group consisting of at least one of dimethyl formamide, N-methylpyrrolidine, dimethyl acetaamide, and other nitrogen including aromatic solvents.

4. The method according to claim 1, wherein said non-solvent is prepared using at least one solvent selected from the group consisting of methanol, water, acetone, hexane, ethanol, iso-propanol, and methyl ethyl ketone.

* * * * *